No. 769,748. PATENTED SEPT. 13, 1904.
O. E. JOHNSTON.
CULTIVATOR TOOTH.
APPLICATION FILED JAN. 20, 1904.
NO MODEL.
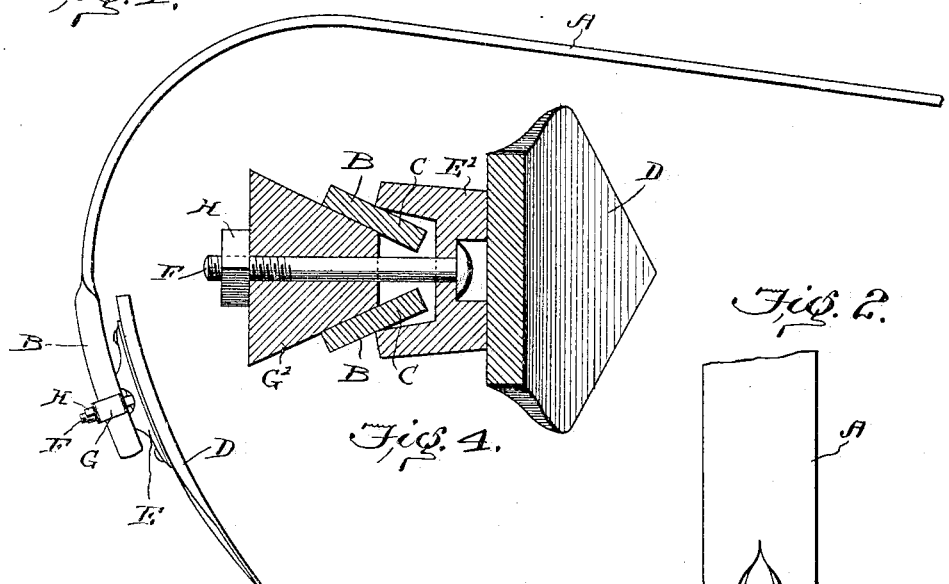
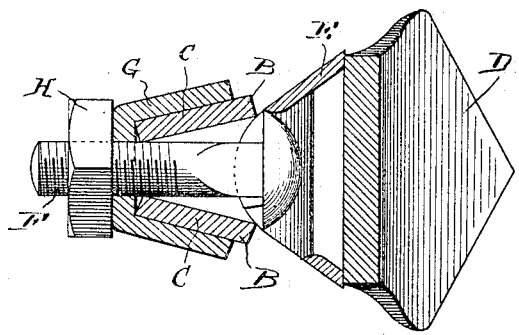
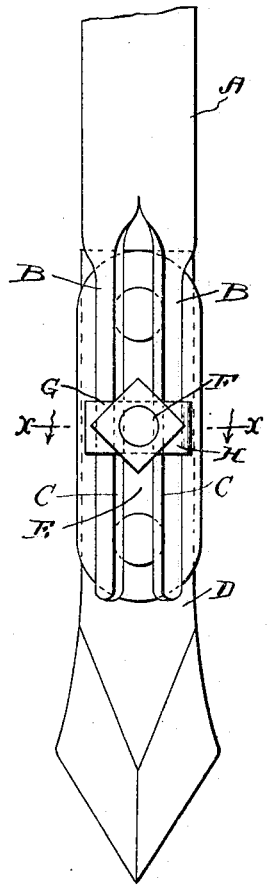
Witnesses
G. H. Walmsley
F. W. Schaefer
Inventor
Oman E. Johnston,
By H. A. Toulmin,
Attorney No. 769,748. Patented September 13, 1904.

UNITED STATES PATENT OFFICE.

OMAN E. JOHNSTON, OF BELLEVUE, OHIO, ASSIGNOR OF ONE-HALF TO THE OHIO CULTIVATOR COMPANY, OF BELLEVUE, OHIO, A CORPORATION OF OHIO.

CULTIVATOR-TOOTH.

SPECIFICATION forming part of Letters Patent No. 769,748, dated September 13, 1904.

Application filed January 20, 1904. Serial No. 189,931. (No model.)

*To all whom it may concern:*

Be it known that I, OMAN E. JOHNSTON, a citizen of the United States, residing at Bellevue, in the county of Huron and State of Ohio, have invented certain new and useful Improvements in Cultivator-Teeth, of which the following is a specification, reference being had therein to the accompanying drawings.

This invention relates to certain new and useful improvements in cultivator-teeth; and the special feature of the invention comprises an improved coupling for connecting the shovels with the shanks or standards, the shank or standard and the shovel together being understood to constitute the tooth.

The invention consists, essentially, in providing the shank with divergent walls or parts, the shovel with a back adapted to enter between these divergent members, a clip adapted to straddle these divergent members, and a bolt and nut adapted to draw the back into the space between the divergent members, so as to tend to separate them, while the clip acts to resist their separation. Thus the parts are made to act against each other and the shovel is firmly held to the shank or standard.

I would further have it understood that the position of the parts stated may be reversed, so that the action of the shovel-back would tend to draw the divergent members toward each other and the action of the clip would be to resist their approach, such action taking place when the nut is screwed sufficiently on the bolt and the result being the same as in the first construction indicated above.

In the accompanying drawings, forming a part of this specification, and on which like reference-letters indicate corresponding parts, Figure 1 is a side elevation of one type of shank or standard which may be used with my invention—namely, a spring or flexible shank or standard—the shovel and coupling being shown in side elevation also; Fig. 2, a rear elevation of a portion of the shank or standard and of the shovel and coupling; Fig. 3, a horizontal sectional view of these parts, taken on the line *x x* of Fig. 2; and Fig. 4, a like sectional view in which the parts are reversed as to their position compared with the position of the parts shown in Fig. 3.

The letter A designates a cultivator-tooth shank or standard, being in the instance selected for illustration a spring shank or standard. The shank or standard, whatever its type or character, is provided with prongs or members B, which stand at an angle to each other, so as to present two divergent walls C, such walls being either on the inner surface of the members, as shown in Fig. 3, or on the outer surface, as shown in Fig. 4. These members B are preferably formed by dividing or bifurcating the lower end of the standard or shank and by giving each member a twist—say something between an eighth and a quarter. This leaves the members in a divergent relative position, the twist or turn being taken in one direction to cause the inner walls to become the divergent walls C and in the other direction to cause the outer walls to become the divergent walls C.

Referring now to the construction shown in Figs. 1, 2, and 3, it will be seen that the letter D indicates the shovel, to which is attached in any suitable manner the back E, which is adapted to enter between the divergent walls C with wedge-like effect, as shown in Fig. 3. This back carries a bolt F, which extends between the walls C and through a clip G and carries a nut H. The clip straddles or fits over the members B, so that when the nut H is screwed on the bolt the back E draws in between the members B, tending to separate them, while the clip G resists this tendency, and thus the parts are interlocked in a firm and reliable manner, the wedging action of the back E acting with great force to set the parts against each other. At the same time the shovel can be adjusted up or down between the members B by loosening the nut H.

Referring now to the modification shown in Fig. 4, it will be seen that the back is modified, as shown at E', by which it is made to embrace the outer divergent surfaces C, while the clip is also modified, as shown at G', and is made to enter between the divergent members; otherwise the parts are the same, while the action of the bolt and nut is exactly the same as in the other form—namely, that of drawing the back against the diverging walls C and of resisting the resulting movement of the members by the clip G'. The parts are therefore held by the binding effect of the back and the clip against the divergent members in either form.

I regard myself as the first to devise this principle of construction in couplings for attaching implement or ground-working shovels to their supporting standards or shanks and wish to be understood accordingly.

Having thus fully described my invention, what I claim as new, and desire to secure by Letters Patent, is—

1. In an implement-tooth, the combination with a shank having divergent members, of a shovel having a part or back engaging with the walls on one side of said members, a clip engaging with those walls on their opposite sides, and a tightening device adapted to draw the parts together to force the members in one direction and resist them in the other direction.

2. In an implement-tooth, the combination with a shank or standard having divergent members, of a shovel having a back or part engaging with one wall of each member, a clip engaging with the opposite walls of each member, and a bolt carried by the said back or shovel part and extending between the members and through the clip and having a nut by which with the bolt the parts are drawn together with a separating and a resisting effect on the members.

3. In an implement-tooth, the combination with a shank divided into members having divergent sides, of a shovel having a back or part engaging with one wall of each member, a clip engaging with the other walls of each member, and a bolt and nut operating to draw the parts together to produce a separating effect and a resisting effect on the members.

4. In an implement-tooth, the combination with a spring-shank divided into members at or near one end, the members being turned to present divergent walls, of a shovel having a back with its outer surface adapted to enter between and against the opposite divergent walls of the members, a clip straddling the members and engaging their outer walls, and a bolt and nut operating to draw the back between the members, and a clip operating to resist the separating of the members.

In testimony whereof I affix my signature in presence of two witnesses.

OMAN E. JOHNSTON.

Witnesses:
 JESSE VICKERY,
 D. O. BOOHER.